United States Patent
Herter et al.

(10) Patent No.: US 8,131,438 B2
(45) Date of Patent: Mar. 6, 2012

(54) METHOD FOR CONTROLLING AN AUTOMATED FRICTION CLUTCH

(75) Inventors: Peter Herter, Ravensburg (DE);
Joachim Staudinger, Ravensburg (DE);
Rainer Petzold, Friedrichshafen (DE);
Franz Bitzer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 343 days.

(21) Appl. No.: 12/531,917

(22) PCT Filed: Mar. 25, 2008

(86) PCT No.: PCT/EP2008/053473
§ 371 (c)(1),
(2), (4) Date: Sep. 18, 2009

(87) PCT Pub. No.: WO2008/119692
PCT Pub. Date: Oct. 9, 2008

(65) Prior Publication Data
US 2010/0113218 A1 May 6, 2010

(30) Foreign Application Priority Data

Mar. 31, 2007 (DE) .......................... 10 2007 015 679

(51) Int. Cl.
*F16D 48/06* (2006.01)

(52) U.S. Cl. .......................... 701/68; 477/174; 192/3.51
(58) Field of Classification Search .................. 701/67, 701/68; 477/174–178; 192/3.51, 3.55–3.58
See application file for complete search history.

(56) References Cited

U.S. PATENT DOCUMENTS

| 4,899,858 | A | 2/1990 | Cote et al. | |
| 5,337,874 | A | 8/1994 | Oltean et al. | |
| 6,711,486 | B1 * | 3/2004 | Karlsson et al. | 701/67 |
| 7,373,235 | B2 * | 5/2008 | Werner et al. | 701/67 |
| 7,835,844 | B2 * | 11/2010 | Werner et al. | 701/68 |
| 2004/0188218 | A1 | 9/2004 | Berger et al. | |

FOREIGN PATENT DOCUMENTS

| DE | 31 16 455 A1 | 11/1982 |
| DE | 32 18 933 A1 | 11/1983 |
| DE | 690 11 906 T2 | 4/1995 |
| DE | 197 12 871 A1 | 10/1998 |
| DE | 198 23 089 A1 | 12/1998 |
| DE | 102 23 465 A1 | 12/2002 |
| DE | 10 2005 006 912 A1 | 9/2005 |
| EP | 0 616 142 A1 | 9/1994 |
| EP | 1 491 787 A1 | 12/2004 |
| EP | 1 510 717 A1 | 3/2005 |
| FR | 2 893 686 A1 | 5/2007 |

* cited by examiner

*Primary Examiner* — Richard M. Camby

(57) ABSTRACT

A method of controlling an automated friction clutch arranged in a drivetrain of a motor vehicle in the force flow, between a motor and transmission, and the automated friction clutch is designed to be passively engaged by spring pressure and can be disengaged and engaged by a controllable clutch actuator. The automated friction clutch is provided with a path sensor for detecting the clutch actuator travel such that during the operation of the motor a current key point of a torque characteristic, provided for controlling the friction clutch, is determined and used for adapting the torque characteristic. With the friction clutch engaged and without the clutch actuator exerting any force, several values of the actuator travel are determined at intervals from which a current engagement point, close to the actual engagement point of the torque characteristic, is determined and with which the torque characteristic is adapted.

7 Claims, 2 Drawing Sheets

METHOD FOR CONTROLLING AN AUTOMATED FRICTION CLUTCH

This application is a National Stage completion of PCT/EP2008/053473 filed Mar. 25, 2008, which claims priority from German patent application serial no. 10 2007 015 679.2 filed Mar. 31, 2007.

FIELD OF THE INVENTION

The invention concerns a method for controlling an automated friction clutch, which is arranged in a drivetrain of a motor vehicle in the force flow between a drive motor and a drive transmission, and which is designed to be closed passively by spring pressure, which can be disengaged and engaged by means of a controllable clutch actuator, and which comprises a path sensor for detecting the actuator travel of the clutch actuator or of an associated transfer element, as the case may be, such that during the operation of the motor vehicle a current key point of a torque characteristic provided for controlling the friction clutch is determined and used to adapt the torque characteristic.

BACKGROUND OF THE INVENTION

Motor vehicles are increasingly equipped with automated friction clutches, whose use frees the driver during starting off and performing gearshift operations from having to carry out coordinated clutch engagement and disengagement, so enabling the driver to concentrate on other tasks. Besides increasing driving comfort, the use of an automated friction clutch, especially in combination with an automated manual transmission, can also reduce the fuel consumption of and the emission of harmful substances from a motor vehicle.

Automated friction clutches of the type mentioned above are mostly formed as dry clutches with at least one drive disk and with spring pressure by at least one contact pressure spring, since this type of structure is particularly well developed and robust, and also occupies only little axial space. Owing to its closed operating condition when the clutch is at rest with no control force acting on it, this type of clutch structure also enables a motor vehicle to be parked safely by engaging a gear in addition to actuating a parking brake.

Mainly in order to bridge speed differences between the drive motor and the input shaft of the transmission during starting and after gearshifts in the drive transmission, and also to allow gearshifts to be carried out free from load, in each case the friction clutch is disengaged and then re-engaged again in a controlled manner such that the clutch torque at any time, i.e. the torque that can be transmitted at a given moment by the friction clutch, is adjusted by the clutch actuator. The clutch actuator can for example be in the form of a pressure-medium-actuated control cylinder, or an electric motor provided with a geared spindle drive, which is arranged outside the friction clutch and whose control piston or spindle shaft is connected by a release lever to a release bearing mounted to move axially on a guide sleeve fixed to the housing, which can for example be in contact with the spring blades of a contact spring made as a diaphragm spring. Alternatively, however, the clutch actuator can be made as a so-termed central release element, in which an annular control piston of an annular cylindrical control cylinder arranged coaxially to the input shaft of the drive transmission and fixed on the housing, is connected directly to the release bearing.

The setting of a given clutch torque, for example a relatively high starting torque or of a relatively low crawling torque, usually takes place by path control in accordance with a torque characteristic, which reproduces the clutch torque of the friction clutch as a function of the actuator travel or of the release travel of the clutch actuator or that of a transmission element such as a release lever or a release bearing. For this purpose the corresponding actuator travel is determined by a path sensor and the control force of the clutch actuator is varied, i.e. increased from the engaged condition and reduced from the disengaged condition, until the desired nominal value of the actuator travel is reached. During this, if a difference is found between the actual value and the desired nominal actuator travel, then in accordance with the difference the actuator travel is increased or reduced until the deviation has been corrected to within a specified tolerance.

The torque characteristic is stored as a function of the actuator travel in a data memory of a control unit by which the clutch actuator is controlled. Starting from the fully engaged condition of the friction clutch, in the release direction the torque characteristic first has a free stretch over which the clutch can be released without the input and output elements of the friction clutch being relieved from the pressure force of the pressure spring, so that the torque that can be transmitted by the clutch remains at the maximum value determined by its design.

This free stretch, which can for example correspond to the bridging of a bearing and/or gearing play between transmission elements of the release mechanism, an axial play between the release bearing and the spring blades of the pressure spring and an axial play of the driveshaft of the drive motor, is necessary to enable the friction clutch to be fully engaged and to be kept engaged under any operating conditions, in particular even if the clutch components become heated for a short time due to its operation, or in the event of wear of the friction linings of the clutch over a longer period.

After this free stretch, the torque characteristic has a regulation range within which the clutch torque that can be transmitted usually decreases digressively from the maximum value to zero. After this there is a saturation zone in which the clutch can be disengaged farther, whereby the input and output elements of the friction clutch are distanced from one another and the torque transmitted by the clutch remains zero. This saturation zone is necessary to enable the clutch to be released completely under any operating conditions.

Thus, the torque characteristic of an automated friction clutch is determined essentially by the value of the release travel known as the engaged point or neutral point, at which the free stretch ends and the regulation range begins, by a value of the release path known as the touch-point or gripping point, at which the regulation range ends and the saturation range begins, and by a shape of the characteristic within the regulation range which is largely determined by the structure of the friction clutch.

Owing to manufacturing tolerances of components, settling phenomena of the contact pressure spring, wear of the friction linings and expansions and deformations of components caused by heat input and/or speed-dependent centrifugal forces, the engaged point and the touch point can be displaced briefly and in the long term. Thus, for comfortable and low-wear actuation of the friction clutch and the starting and shifting processes it controls, the respective current values of the engaged point and the touch-point must be known as accurately as possible, between which the regulation range of the torque characteristic extends and can be adapted, i.e. adjusted to the current physical and technical realities, with reference to those key points.

Concerning this problem there already exist numerous proposals for devices and methods for the control of an automated friction clutch, with which a current value of the engaged point or of the touch-point can be determined.

Besides during starting and shifting processes, the engaged point of the torque characteristic of a friction clutch can also be determined with the vehicle at rest and during driving, and can thus be determined relatively frequently. A corresponding device and method for this are known for example from DE 31 16 455 A1. According to this it is provided that from the actuating-force-free, i.e. the fully engaged condition, the clutch is loaded in the release direction with an actuating force which is smaller than a force needed to release it, but which suffices to bridge the free stretch. The actuator travel detected by the path sensor when the clutch actuator has reached equilibrium is stored as the current engaged point and used to adapt the torque characteristic. However, the disadvantage of this known method is that active control of the clutch actuator is needed, which entails some effort and expense and by which the subsequent actuation of the clutch during driving operation is impeded and can be disturbed because of altered response behavior of the clutch actuator.

Determination of the touch-point of a torque characteristic is distinctly more difficult and can in practice be done only with the vehicle at rest or during coasting phases, therefore being determined much less frequently. In some methods it is provided that with the motor vehicle at rest, the drive motor running and the transmission gears disengaged, a current value of the touch-point of the friction clutch is determined by engaging the clutch, from the completely disengaged condition, until a speed increase of the input shaft is sensed, and the actuator travel value then detected is used as the new touch-point or for the correction of an existing touch-point. Corresponding methods are described, for example, in DE 32 18 933 A1 and U.S. Pat. No. 4,899,858 A.

Other methods provide that with the motor vehicle at rest, the working or parking brake applied, the drive motor running and a gear engaged, a current friction clutch touch-point value is determined by engaging the clutch continuously from the fully disengaged condition, until a reaction of the drive motor due to an effective idling adjustment can be recognized, and the actuator travel value detected is used as the new touch-point or for the correction of an existing touch-point. Corresponding methods are known from DE 102 23 465 A1 and DE 197 12 871 A1.

SUMMARY OF THE INVENTION

With regard to the disadvantages of the above methods, the purpose of the present invention is to propose a method for controlling an automated friction clutch of the type mentioned earlier, with which key points of a torque characteristic for its adaptation can be determined simply and with high accuracy.

The invention begins from a method for controlling an automated friction clutch arranged in the drivetrain of a motor vehicle in the force flow between a drive motor and a drive transmission, and which is designed to be engaged passively by spring pressure, which can be disengaged and engaged by means of a controllable clutch actuator, and which comprises a path sensor for detecting in each case the actuator travel of the clutch actuator or of an associated transmission element, such that during the operation of the motor vehicle a current key point of a torque characteristic for the control of the friction clutch is determined and used for adapting the torque characteristic.

In addition, the invention provides that with the friction clutch engaged and the clutch actuator free from force, several values of the actuator travel are detected at fixed time intervals, and by computation from these values a current engaged point close to the actual engaged point of the torque characteristic is determined, with which the said torque characteristic is adapted.

The invention is based on the recognition that in operating conditions when the friction clutch is engaged and the clutch actuator is not exerting any force, i.e. other than during starting and shifting processes, which conditions therefore exist relatively frequently, relatively many values of the actuator travel corresponding to the engaged point can be detected, which however, are characterized by a large scatter because of fluctuations caused by the motor or in other ways. However, by using suitable mathematical evaluation methods a current engaged point relatively close to the actual engagement point can be determined. Since during this the clutch actuator remains in its no-force condition, other control sequences of the friction clutch and the driving transmission are not affected. In contrast to the known method of determining the engagement point, with the method according to the invention the detection of the engagement point value for friction clutch actuation can be interrupted at any time and continued later.

The method according to the invention can be designed such that several actuator travel values are determined within a short time period, and the current engagement point is taken to be the extreme value located farthest in the release direction. Since the time period during which the actuator travel values are detected is relatively short, the engagement point determined in this way is almost identical to the actual engagement point, since longer-term effects such as the thermal expansion of components due to an input of friction heat, or wear of the friction linings, can have no effect.

However, if it is not possible to determine several values in a short period, it can alternatively be provided that several actuator travel values are detected over a longer time period and the actual engagement point is determined as the weighted mean of these values, in such manner that the values detected more recently are weighted more strongly than those detected earlier. With this method variant too, the engagement point determined is close to the actual engagement point, so the adaptation of the torque characteristic based on it is relatively accurate.

Apart from this, several actuator travel values can be detected over a longer time period and the current engagement point determined as a weighted mean of these values, weighting the values that lie farther in the release direction more strongly than those lying more in the engagement direction.

In the event that a periodic deviation from the actual engagement point caused by oscillations is taking place, to avoid a synchronous detection of respective, substantially equally far-removed values of the actuator travel it is appropriate to vary the time intervals between actuator travel value detections.

If there is a static deviation from the actual engagement point, to avoid an erroneous determination of the engagement point it is also expedient, with the drive motor stopped and/or the drive transmission in its neutral position, to release and then re-engage the friction clutch first before detecting one or more values of the actuator travel. This will position the components of the release device largely in the release direction, so that the free path is minimal and the actuator travel values detected are close to the actual engagement point.

If after the determination of a new actual engagement point there is no currently determined touch-point, but only an older touch-point determined earlier, this touch-point and the torque characteristic values between the engagement point and the touch-point are in each case corrected by the actuator travel difference between the currently determined engagement point and the previous valid engagement point. In the torque characteristic diagram this corresponds to a parallel displacement of the torque characteristic along the actuator travel axis by the amount of the actuator travel difference.

In contrast, if there is a relatively currently determined, more recent touch-point then this is preferably retained as the current touch-point and the torque characteristic values between the engagement point and the touch-point are adapted by a proportional correction between the current engagement point and the current touch-point. In the torque characteristic diagram, if the separation between the engagement point and the touch-point is becoming smaller this corresponds to a proportional compression, and if the separation between the engagement point and the touch-point is becoming larger, to a proportional extension of the working range of the torque characteristic.

BRIEF DESCRIPTION OF THE DRAWINGS

To clarify the invention, the description of a drawing is attached. The drawings show.

DETAILED DESCRIPTION OF THE PREFERRED EMBODIMENTS

Figure 3:
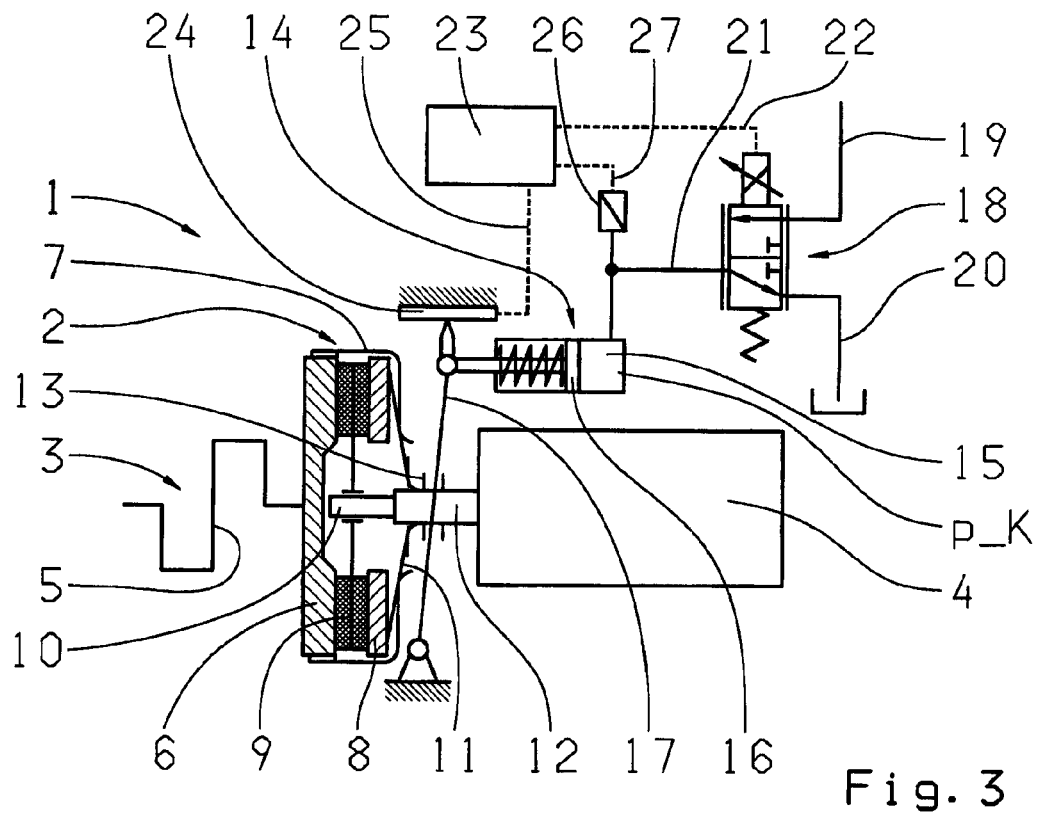
FIG. 3: Clutch arrangement for using the method according to the invention.

FIG. 3 illustrates an example of a clutch arrangement for using the method according to the invention. In this, a friction clutch 2 made as a single-disk dry clutch is arranged in the force flow between a drive motor 3 made as an internal combustion engine, and a drive transmission.

The input side of the friction clutch 3 is formed by a flywheel 6 fixed on the crankshaft 5 of the drive motor 3, and a pressure plate 8 connected thereto by a clutch cage 7. The output side of the friction clutch 2 is formed by a drive disk 9 arranged between the flywheel 6 and the pressure plate 8, which is mounted rotationally fixed but axially movably on the input shaft 10 of the drive transmission 4. By virtue of a contact pressure spring 11 made as a diaphragm spring and arranged between the clutch cage 7 and the pressure plate 8, the friction clutch 2 is engaged in its rest condition when there is no actuation force, and can be disengaged and engaged by means of a release bearing 13 mounted to move axially on a guide sleeve 12 fixed on the housing and in contact, with some play, against radially inner spring blades of the contact pressure spring 11.

The release bearing 13 is actuated and a desired clutch torque M_K of the friction clutch 2 is accordingly set by means of a pressure-medium-actuated clutch actuator 14, which in the present case is in the form of a simple-action control cylinder with a control piston 16 mounted to move axially, which can be displaced against the restoring force of a restoring spring by an actuating pressure p_k acting in a pressure chamber 15. With its piston rod, the control piston 16 is connected with some play via a release lever 17 fixed at one end to the housing and able to pivot, to the release bearing 13 in such manner that an increasing actuating pressure p_K leads to disengagement of the friction clutch and thus to a reduction of the clutch torque M_K.

The clutch actuator 14 is controlled by a control valve 18, in this case formed as a 3/2-way proportioned magnetic valve with two inlets and one outlet, the first inlet being connected to a pressure line 19, the second inlet to an unpressurized line 20 and the outlet, via a connection line 21, to the pressure chamber 15 of the clutch actuator 14.

To actuate the control valve 18, it is connected via an electric control line 22 to a control unit 23. Thus, by virtue of this structure the clutch torque M_K is varied by a continuous variation of the actuating pressure p_K of the clutch actuator 14.

To detect the actuator travel x_K of the control piston 16 or the release lever 17, a path sensor 24 is arranged on the piston rod of the control piston 16, which is connected to the control unit 23 by a sensor lead 25. To detect the actuating pressure p_K of the clutch actuator 14 a pressure sensor 26 is connected to the connection line 21, which is connected to the control unit 23 by a sensor lead 27. Thus, in principle both path-dependent control and pressure-dependent control of the friction clutch 2 are possible. In the present case, however, path-dependent control of the friction clutch 2 is envisaged.

Figure 4:
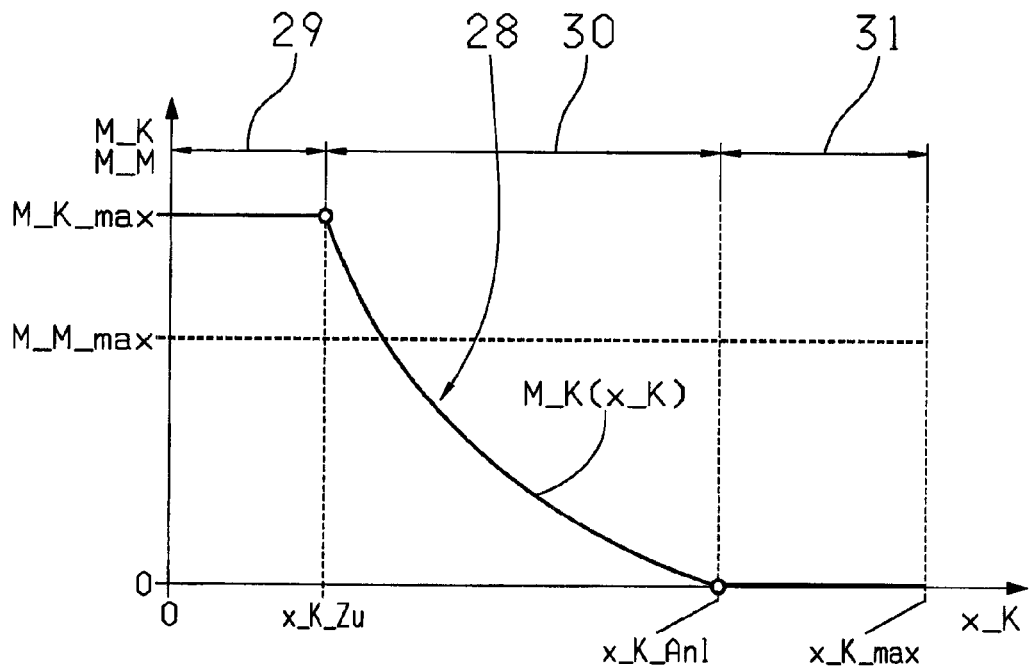
FIG. 4: Diagram showing the torque characteristic of a friction clutch.

A corresponding torque characteristic 28, which reproduces the clutch torque M_K that can be transmitted as a function of the actuator travel x_K or release path, is illustrated in a general form in FIG. 4. Starting from the fully engaged condition (x_K=0) of the friction clutch 2, in the release direction, i.e. with increasing release path x_K the torque characteristic 28 first follows a free stretch 29 that results in the present case from an axial play of the crankshaft 5, the clearance play between the release bearing 13 and the spring tabs of the contact pressure spring 11, and some play in the joints of the release lever 17, until the clutch actuator 14 can be actuated, without the transmissible torque M_K of the friction clutch 2 departing from the design-predetermined maximum value M_K_max, which is much higher than the maximum torque M_M_max of the drive engine.

Thereafter, the torque characteristic 28 has a regulation range 30 within which the transmissible torque M_K of the clutch 2 decreases degressively from the maximum value M_K_max down to zero. This is followed by a saturation range 31 in which the friction clutch 2 can be released farther until the maximum actuator travel x_K_max is reached, while the transmissible torque value M_K remains zero.

The beginning and end of the working range 30 are marked by the engagement point x_K_Zu and the touch-point x_K_Anl, which are characteristic key points or a value pair of the torque characteristic 28. Since the qualitative course of the torque characteristic 28 between these two key points is predetermined by design and does not essentially vary, it suffices for adaptation, i.e. a correction of the torque characteristic 28 due to temperature or wear, to determine the respective current values of the engagement point x_K_Zu and touch-point x_K_Anl. The points of the torque characteristic 28 between these can be determined, for example, by linear interpolation between the actual values of the engagement point x_K_Zu and the touch-point x_K_Aul.

Figure 1:
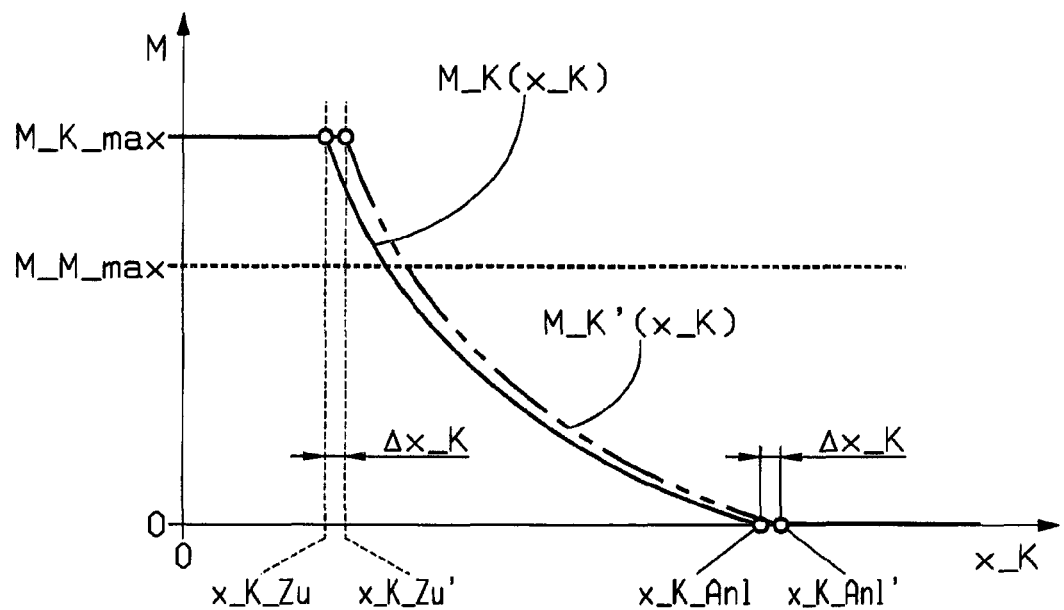
FIG. 1: Diagram with the torque characteristic of a friction clutch and a first method variant for adapting the torque characteristic.

In the diagram of FIG. 1 a first example of an adaptation of the torque characteristic 28 is illustrated. With the friction clutch 2 engaged and the clutch actuator 14 exerting no force, several values of the actuator travel x_K were determined one after another from which, by computation, for example by determining the extreme value located farthest in the release direction or by calculating a weighted mean value, a current engagement point x_K_Zu was determined. Between the current engagement point x_K_Zu and the older engagement point x_K_Zu determined earlier there is an actuator travel difference x_K=x_K_Zu–x_K_Zu.

Since in the example of FIG. 1 there is no current touch-point x_K_Anl, as this can only be determined with considerably more difficulty and more rarely than the engagement point x_K_Zu, the existing older touch-point x_K_Anl and the values of the torque characteristic 28 between the engagement point x_K_Zu and the touch-point x_K_Anl are in each case corrected by the actuator travel difference x_K, and the torque characteristic 28 is adapted thereby. In FIG. 1 the course of the older torque characteristic M_K (x_K), valid at the time when the method was applied, is represented by a dot-dash line, whereas the course of the adapted, current torque characteristic M_K(x_K) is shown as a continuous line.

Figure 2:
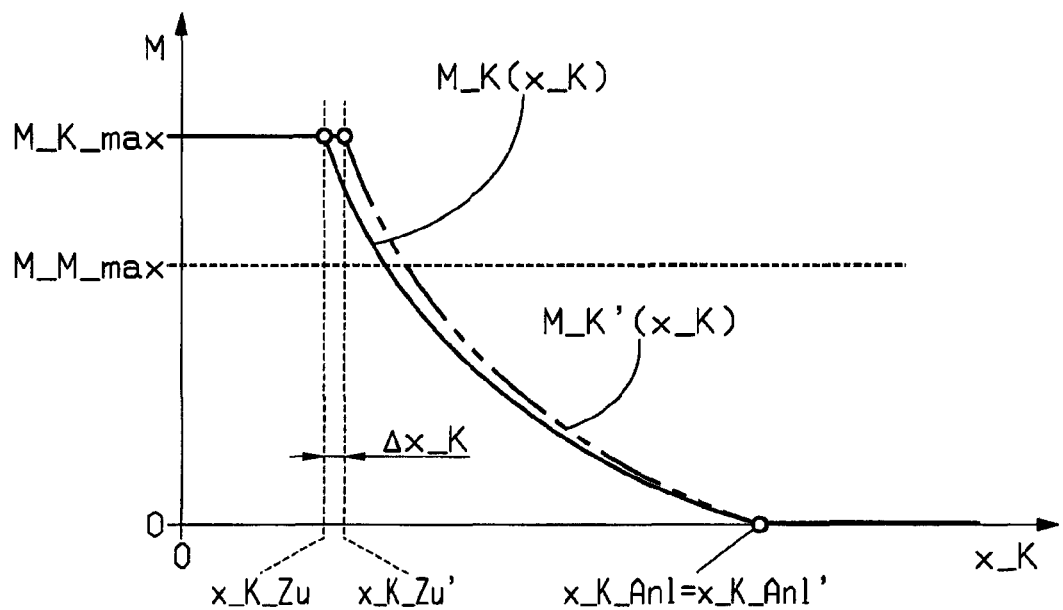
FIG. 2: Diagram with the torque characteristic of a friction clutch and a second method variant for adapting the torque characteristic.

In contrast, if a value of the touch-point x_K_Anl exists, which at the method application time was current or determined only a short time earlier, then this "older touch-point" x_K_Anl is retained as the current touch-point x_K_Anl (x_K_Anl=x_K_Anl) and the values of the torque characteristic 28 between the engagement point x_K_Zu and the touch-point x_K_Anl are adapted by a proportional correction between the current engagement point x_K_Zu and the current touch-point x_K_Anl. This means that the correction of the values of the torque characteristic 28 by the actuator travel difference x_K decreases linearly to zero from the point x_K_Zu to the point x_K_Anl. A corresponding adaptation of a torque characteristic 28 is illustrated in FIG. 2, in which the course of the older torque characteristic M_K (x_K) valid at the time when the method was applied is shown as a dot-dash line and the course of the adapted, current torque characteristic M_K(x_K) is shown a continuous line.

INDEXES

1 Clutch arrangement
2 Friction clutch
3 Drive motor
4 Drive transmission
5 Crankshaft
6 Flywheel
7 Clutch cage
8 Pressure plate
9 Drive disk
10 Input shaft
11 Contact pressure spring
12 Guide sleeve
13 Release bearing
14 Clutch actuator
15 Pressure chamber
16 Actuating piston
17 Release lever
18 Control valve
19 Pressure line
20 Unpressurized line
21 Connection line
22 Control line
23 Control unit
24 Path sensor
25 Sensor lead
26 Pressure sensor
27 Sensor lead
28 Torque characteristic
29 Free path
30 Working range
31 Saturation range
M Torque
M_K Transmissible torque, clutch torque
M_K(x_K) Current torque characteristic
M_K (x_K) Older torque characteristic
M_K_max Maximum clutch torque
M_M Motor torque
M_M_max Maximum motor torque
p_K Actuation pressure
x_K Actuator travel, release path
x_K_Anl Touch-point, current touch-point
x_K_Anl Older touch-point
x_K_max Maximum actuator travel
x_K_Zu Engagement point, current engagement point
x_K_Zu Older engagement point
x_K Actuator travel difference

The invention claimed is:

1. A method of controlling an automated friction clutch arranged in a drivetrain of a motor vehicle in a force flow, between a drive motor (3) and a drive transmission (4), the automated friction clutch being passively engaged by spring pressure and being disengaged and engaged by a controllable clutch actuator (14), and comprising a path sensor (24) for detecting a respective actuator travel (x_K) of at least one of the clutch actuator (14) and an associated transmission element (17) such that, during operation of the motor vehicle, a current key point (x_K_Anl, x_K_Zu) of a torque characteristic (28), provided for control of the friction clutch (2), is determined and used for adapting the torque characteristic (28), the method comprising the steps of:

determining several values of the actuator travel (x_K), with the friction clutch (2) engaged and without the clutch actuator (14) exerting any force, at fixed time intervals;

computing, from the several values of the actuator travel (x_K), a current engagement point (x_K_Zu) close to an actual engagement point of the torque characteristic (28);

adapting the torque characteristic (28) with regard to the current engagement point (x_K_Zu); and detecting the several values of the actuator travel (x_K) within a relatively short period of time; and determining the current engagement point (x_K_Zu) as an extreme value (x_K_max) with a largest actuator travel value (x_K) in a release direction.

2. A method of controlling an automated friction clutch arranged in a drivetrain of a motor vehicle in a force flow, between a drive motor (3) and a drive transmission (4), the automated friction clutch being passively engaged by spring pressure and being disengaged and engaged by a controllable clutch actuator (14), and comprising a path sensor (24) for detecting a respective actuator travel (x_K) of at least one of the clutch actuator (14) and an associated transmission element (17) such that, during operation of the motor vehicle, a current key point (x_K_Anl, x_K_Zu) of a torque characteristic (28), provided for control of the friction clutch (2), is determined and used for adapting the torque characteristic (28), the method comprising the steps of:

determining several values of the actuator travel (x_K), with the friction clutch (2) engaged and without the clutch actuator (14) exerting any force, at fixed time intervals;

computing, from the several values of the actuator travel (x_K), a current engagement point (x_K_Zu) close to an actual engagement point of the torque characteristic (28);

adapting the torque characteristic (28) with regard to the current engagement point (x_K_Zu); and detecting the several values of the actuator travel (x_K) within a relatively longer period of time, and the current engaged point (x_K_Zu) is determined as a weighted mean of the values of the actuator travel (x_K), with values detected more recently being weighted more heavily than values detected at later times.

3. A method of controlling an automated friction clutch arranged in a drivetrain of a motor vehicle in a force flow, between a drive motor (3) and a drive transmission (4), the automated friction clutch being passively engaged by spring pressure and being disengaged and engaged by a controllable clutch actuator (14), and comprising a path sensor (24) for detecting a respective actuator travel (x_K) of at least one of the clutch actuator (14) and an associated transmission element (17) such that, during operation of the motor vehicle, a current key point (x_K_Anl, x_K_Zu) of a torque characteristic (28), provided for control of the friction clutch (2), is determined and used for adapting the torque characteristic (28), the method comprising the steps of:
    determining several values of the actuator travel (x_K), with the friction clutch (2) engaged and without the clutch actuator (14) exerting any force, at fixed time intervals;
    computing, from the several values of the actuator travel (x_K), a current engagement point (x_K_Zu) close to an actual engagement point of the torque characteristic (28);
    adapting the torque characteristic (28) with regard to the current engagement point (x_K_Zu); and
    detecting the several values of the actuator travel (x_K) within a relatively longer period of time, and the current engaged point (x_K_Zu) is determined as a weighted mean of the values of the actuator travel (x_K), with values located farther in a release direction (x_K_max) being weighted more heavily than values located farther in an engagement direction (x_K=0).

4. A method of controlling an automated friction clutch arranged in a drivetrain of a motor vehicle in a force flow, between a drive motor (3) and a drive transmission (4), the automated friction clutch being passively engaged by spring pressure and being disengaged and engaged by a controllable clutch actuator (14), and comprising a path sensor (24) for detecting a respective actuator travel (x_K) of at least one of the clutch actuator (14) and an associated transmission element (17) such that, during operation of the motor vehicle, a current key point (x_K_Anl, x_K_Zu) of a torque characteristic (28), provided for control of the friction clutch (2), is determined and used for adapting the torque characteristic (28), the method comprising the steps of:
    determining several values of the actuator travel (x_K), with the friction clutch (2) engaged and without the clutch actuator (14) exerting any force, at fixed time intervals;
    computing, from the several values of the actuator travel (x_K), a current engagement point (x_K_Zu) close to an actual engagement point of the torque characteristic (28);
    adapting the torque characteristic (28) with regard to the current engagement point (x_K_Zu); and
    varying the time intervals between the detection of the values of the actuator travel (x_K).

5. A method of controlling an automated friction clutch arranged in a drivetrain of a motor vehicle in a force flow, between a drive motor (3) and a drive transmission (4), the automated friction clutch being passively engaged by spring pressure and being disengaged and engaged by a controllable clutch actuator (14), and comprising a path sensor (24) for detecting a respective actuator travel (x_K) of at least one of the clutch actuator (14) and an associated transmission element (17) such that, during operation of the motor vehicle, a current key point (x_K_Anl, x_K_Zu) of a torque characteristic (28), provided for control of the friction clutch (2), is determined and used for adapting the torque characteristic (28), the method comprising the steps of:
    determining several values of the actuator travel (x_K), with the friction clutch (2) engaged and without the clutch actuator (14) exerting any force, at fixed time intervals;
    computing, from the several values of the actuator travel (x_K), a current engagement point (x_K_Zu) close to an actual engagement point of the torque characteristic (28);
    adapting the torque characteristic (28) with regard to the current engagement point (x_K_Zu); and
    before determining the several values of the actuator travel (x_K), releasing and re-engaging the friction clutch (2) with at least one of the drive motor (3) stopped and the drive transmission (4) in a neutral position.

6. A method of controlling an automated friction clutch arranged in a drivetrain of a motor vehicle in a force flow, between a drive motor (3) and a drive transmission (4), the automated friction clutch being passively engaged by spring pressure and being disengaged and engaged by a controllable clutch actuator (14), and comprising a path sensor (24) for detecting a respective actuator travel (x_K) of at least one of the clutch actuator (14) and an associated transmission element (17) such that, during operation of the motor vehicle, a current key point (x_K_Anl, x_K_Zu) of a torque characteristic (28), provided for control of the friction clutch (2), is determined and used for adapting the torque characteristic (28), the method comprising the steps of:
    determining several values of the actuator travel (x_K), with the friction clutch (2) engaged and without the clutch actuator (14) exerting any force, at fixed time intervals:
    computing, from the several values of the actuator travel (x_K), a current engagement point (x_K_Zu) close to an actual engagement point of the torque characteristic (28);
    adapting the torque characteristic (28) with regard to the current engagement point (x_K_Zu); and
    adapting an older touch point and the values of the torque characteristic (28), between the engagement point (x_K_Zu) and the older touch-point (x_K_Anl), by an amount of a difference of the actuator travel (x_K), between the current engagement point (x_K_Zu) determined and a previously valid, older engagement point (x_K_Zu).

7. A method of controlling an automated friction clutch arranged in a drivetrain of a motor vehicle in a force flow, between a drive motor (3) and a drive transmission (4), the automated friction clutch being passively engaged by spring pressure and being disengaged and engaged by a controllable clutch actuator (14), and comprising a path sensor (24) for detecting a respective actuator travel (x_K) of at least one of the clutch actuator (14) and an associated transmission element (17) such that, during operation of the motor vehicle, a current key point (x_K_Anl, x_K_Zu) of a torque characteristic (28), provided for control of the friction clutch (2), is determined and used for adapting the torque characteristic (28), the method comprising the steps of:

determining several values of the actuator travel (x_K), with the friction clutch (2) engaged and without the clutch actuator (14) exerting any force, at fixed time intervals;

computing, from the several values of the actuator travel (x_K), a current engagement point (x_K_Zu) close to an actual engagement point of the torque characteristic (28);

adapting the torque characteristic (28) with regard to the current engagement point (x_K_Zu); and retaining a more recent touch-point (x_K_Anl) as a current touch-point (x_K_Anl) and adapting the values of the torque characteristic (28) between the current engagement point (x_K_Zu) and the current touch-point (x_K_Anl).

* * * * *